United States Patent

Kennedy et al.

[11] Patent Number: 5,542,835
[45] Date of Patent: Aug. 6, 1996

[54] LEAK DETECTOR FOR AN INJECTION MOULDING MACHINE

[75] Inventors: Gerard P. Kennedy; John P. M. Donnelly, both of Dublin, Ireland

[73] Assignee: Teetotum Limited, Dublin, Ireland

[21] Appl. No.: 295,806

[22] PCT Filed: Mar. 5, 1993

[86] PCT No.: PCT/IE93/00010

§ 371 Date: Nov. 7, 1994

§ 102(e) Date: Nov. 7, 1994

[87] PCT Pub. No.: WO93/18384

PCT Pub. Date: Sep. 16, 1993

[30] Foreign Application Priority Data

Mar. 6, 1992 [IE] Ireland ................. 920731

[51] Int. Cl.$^6$ ................. B29C 45/17; G01M 3/26; G01M 3/04

[52] U.S. Cl. ................. 425/136; 264/328.1; 425/154; 425/169; 425/542; 425/210

[58] Field of Search ................. 264/40.1, 328.1, 264/39; 73/40.5 R, 46; 425/136, 151, 150, 154, 168, 169, 542, 210

[56] References Cited

U.S. PATENT DOCUMENTS

| 3,623,053 | 11/1971 | Meyer | 73/40.5 R |
|---|---|---|---|
| 4,473,345 | 9/1984 | McDowall | 425/154 |
| 4,484,878 | 11/1984 | Anders et al. | 425/169 |
| 4,921,416 | 5/1990 | Green | 425/143 |
| 5,072,622 | 12/1991 | Roach et al. | 73/40.5 R |

FOREIGN PATENT DOCUMENTS

| 1552138 | 1/1969 | France . | |
|---|---|---|---|
| 60-117547 | 6/1985 | Japan | 425/136 |

OTHER PUBLICATIONS

Extract from Telemechanique Technical Handbook (four pages published circa 1988).

Primary Examiner—Jill L. Heitbrink
Attorney, Agent, or Firm—Dean W. Russell; Kilpatrick & Cody

[57] ABSTRACT

A leak detector for a plastics injection molding machine comprises a small diameter conduit (20) located adjacent to a potential leak site on or associated with the machine, through which a regulated supply of air is emitted. When the conduit outlet (26) is blocked with leaked molten plastics, a sensor (45) in the conduit instantly detects a change in air flow or back pressure and triggers an alarm (65), and optionally cuts off the machine automatically to avoid damage to machine components and with the object of reducing machine down time. Changes in incoming primary air supply pressure may be detected to provide a fail-safe system. Alternatively, air pressure in the conduit (20) may be below zero, i.e. a vacuum, so that air is sucked into the conduit at its outlet (26). Several potential leak sites may be monitored simulatneously from a single sensor arrangement.

37 Claims, 2 Drawing Sheets

LEAK DETECTOR FOR AN INJECTION MOULDING MACHINE

BACKGROUND OF THE INVENTION

This invention relates to apparatus for detecting leaks of molten plastics material in an injection moulding machine, in particular, leaks due to misalignment or wear of the nozzle and the mould in injection moulding of plastics, but also in hot runner injection systems or leaks of molten plastics material at any location or locations where rapid detection of leaking material is necessary to avoid machine down time.

A problem arises in injection moulding with leakage at the interface of the mould and the nozzle of the injection moulding machine. Leakage arises if the nozzle and the sprue bush where the nozzle makes contact with the mould are misaligned or if wear has occurred to the nozzle or the sprue bush opening up an unacceptable clearance gap.

The leakage of molten plastics material under pressure has many harmful effects and may occur as a slow creep or "drool" or as a rapid ballooning of sprue from the nozzle region. A decrease in the level of pressure inside the mould reduces the quality of the product being moulded by causing shrinkage. The leaking drool can short out heater bands, damage wires and terminals and destroy insulation blankets around the injection nozzle. The cost of spare parts and down time during repair is very high. There is also the increased risk to personal safety of machine operators. The solidified drool has an irregular surface and may have to be burnt off with a blow-lamp giving rise to smoke and poisonous fumes. It will be appreciated that the hot plastics material solidifies very quickly.

There have been previous attempts to deal with the problem. One prior device supplied by Insul-Vest Inc. comprises a protective jacket which covers the nozzle and heater bands of the injection moulding machine such that when leakage occurs the drool spreads over the jacket and is prevented from spreading onto the rest of the machine. The jacket is made from material which allows the leaked drool to be removed easily. This device only seeks to limit the damage caused by the leakage. It ignores problems of material wastage and loss of pressure inside the mould causing subsequent deterioration in quality.

Another approach, disclosed in U.S. Pat. No. 4,921,416, is to use a thermocouple which is positioned adjacent to the sprue bush and nozzle interface to detect abnormal changes in temperature caused by leakage. An electronic control unit linked to the thermocouple is adapted to give an alarm when a level of temperature outside the normal operating range is sensed. This is not a satisfactory solution either because the temperature around the nozzle during fault-free operations (when there is no leakage) is not necessarily constant. The temperature can vary depending on the type of plastics used, the length of time during which the machine is in continuous operation and on ambient conditions.

Another approach is to use a proximity sensor to detect the presence of leaked material at a specified location, and this is the approach which is favoured in the present invention. Very many electronic, optoelectronic and electromagnetic switching devices are known to detect the presence or proximity of moving objects on a production line. The present invention seeks to use a simpler, fail-safe method of detection which relies on sensing small changes in air pressure in a pneumatic system which responds quickly to the presence of leaked material adjacent to an air outlet. Pneumatic bleed sensors are known as proximity sensors, but the present invention provides a system of leakage detection providing a rapid response and an automatic alarm and shut down function as well as a fail-safe operation, not hitherto available.

SUMMARY OF THE INVENTION

According to the present invention, there is provided a leak detector for a plastics injection moulding machine wherein the detector comprises a conduit for supplying a flow or intermittent pulses of fluid to a conduit outlet located adjacent to a potential leak site in or associated with the machine, a source of fluid in communication therewith, means for sensing a change in fluid pressure inside the conduit caused by the presence of leaked material blocking the conduit outlet and of producing an electronic output signal, and electronic indicating means responsive to the electronic output signal and capable of instaneously indicating a leak condition.

Advantageously, the source of fluid is air, supplied at a substantially constant pressure, or as pulses about every 30 seconds. Most preferably, air pressure at the conduit outlet is less than 345 mb Alternatively, the air pressure is less than zero, i.e. a vacuum, or a pulsed vacuum.

When the equipment is operating leak-free, the flow of air at the outlet is kept constant by a flow regulator. Under fault conditions the conduit outlet adjacent to the potential leak site becomes constricted or blocked by the leaking material and the pressure within the conduit either builds up or reduces depending on whether the air is being supplied under pressure or under vacuum through the conduit. When this pressure reaches a predetermined threshold it activates the pressure sensor which in turn may be adapted to halt operation of the injection moulding machine.

The conduit is preferably a pipe of narrow diameter, most preferably less than 2 mm. When the potential leak site is the interface between an injection nozzle and a sprue bush of the mould, the conduit may be located along the exterior of the barrel and the nozzle of the injection moulding machine, or defined as a duct within the barrel wall and the injection nozzle, with the conduit outlet located adjacent said interface. Alternatively, the conduit outlet is preferably located on the platen adjacent to the sprue bush of the mould.

When the potential leak site is associated with a sprue hot runner system, the conduit outlet is preferably located adjacent to the runner or in a wiring cavity.

Means may be provided for simultaneously monitoring a plurality of leak detectors and different potential leak sites.

The means for sensing a change in fluid pressure inside the conduit is preferably an adjustable pressure sensor. The pressure sensor preferably has an operating pressure of between 5 mb to 690 mb, or a vacuum of the same general order of magnitude. Ideally, the pressure sensor is adapted to activate a latching circuit which must be reset to clear a leak or alarm condition. Alternatively, the injection moulding machine is adapted to continue operation in a by-pass mode even if the pressure sensor signals a leak condition.

BRIEF DESCRIPTION OF THE INVENTION

The invention will now be described with reference to the accompanying drawings of which:

DETAILED DESCRIPTION OF PREFERRED EMBODIMENTS

Figure 1:
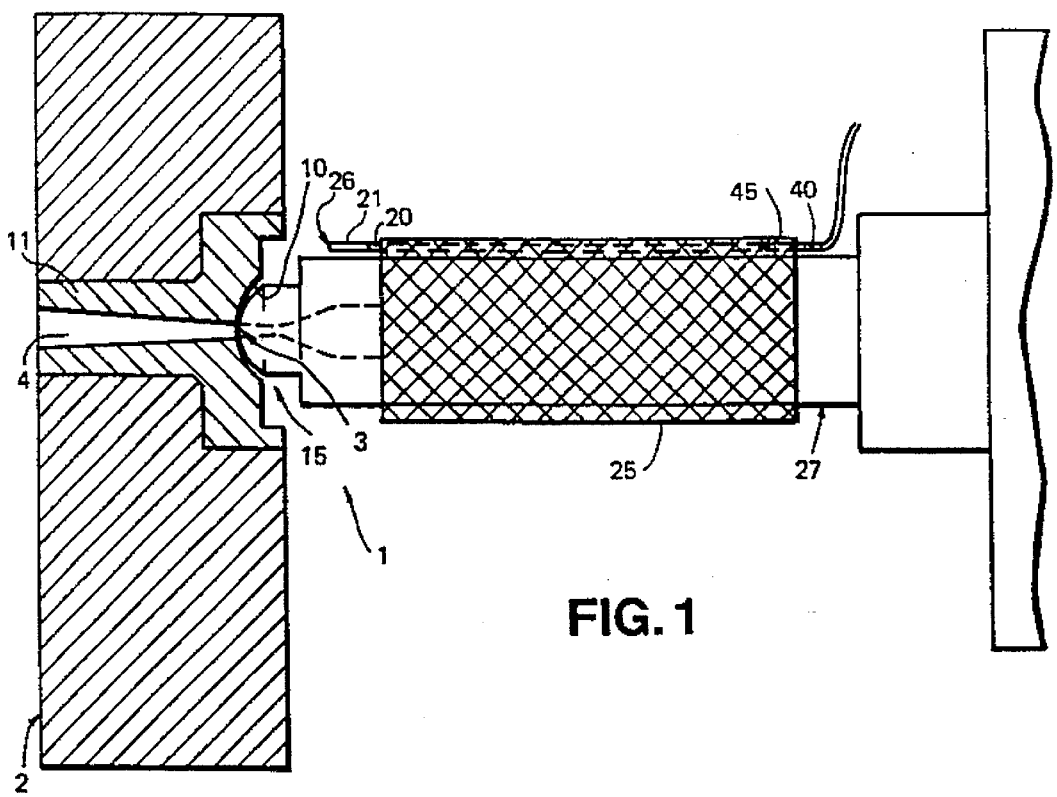
FIG. 1 is an enlarged part cross-sectional view of the mould/nozzle interface with a nozzle leak detector in accordance with a preferred embodiment of the invention.

FIG. 1 shows an injection nozzle 1 and part of a mould 2 as used in a typical moulding machine. The nozzle comprises a nozzle barrel 27 which receives the molten material or melt which has been forced under pressure by a screw feed, not shown, into the barrel 27 with its associated heaters 25. These heaters bring the molten material in the barrel to the correct temperature for injection into the mould. A nozzle head 15 has a convex outer surface and an orifice 3 through which the melt is forced into the cavity, not shown, of the mould 2.

A sprue bush insert 11 in the mould, has a concave mouth 10, of slightly larger radius than the nozzle nose 15. The purpose is to create a leak free seal at the interface of the nozzle nose and the sprue bush.

The molten plastics material is forced through the nozzle into the mould at high temperature and high pressure. Any minor misalignment of the nozzle head and the sprue bush, or wear in either component, will result in a faulty seal and an escape of melt into the air space around the nozzle. This drool can cause damage to sensitive controls and parts of the machine due to the high temperature of the leaking plastics material. It may also remain undetected by the operator until much damage has been done.

Figure 2A:
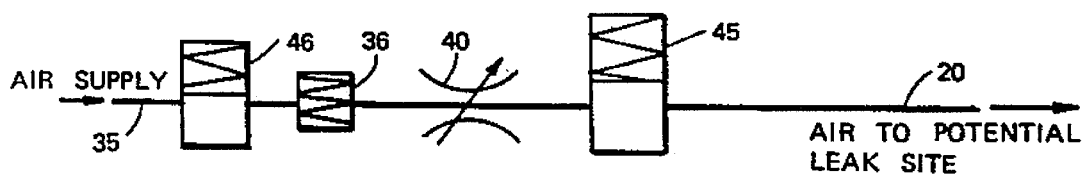
FIG. 2a is a schematic diagram of a pneumatic circuit for use with the invention.

In one embodiment of the invention (See FIG. 2a) the conduit 20, connected to a primary source of air 35, for example about 140 mb to 14 bar, via a pressure regulator 36 which reduces pressure down to about 207 mb, terminates in the air space adjacent to the interface of the nozzle and the sprue bush of the mould. The conduit incorporates a flow regulator 40, linked to a pressure sensor 45, which can be set to a predetermined value. The conduit is preferably a copper pipe, for example of less than 2 mm I.D., and is suitably located inside an insulation jacket or heater band 25. This has the effect of raising the temperature of the air in the conduit.

Figure 2B:
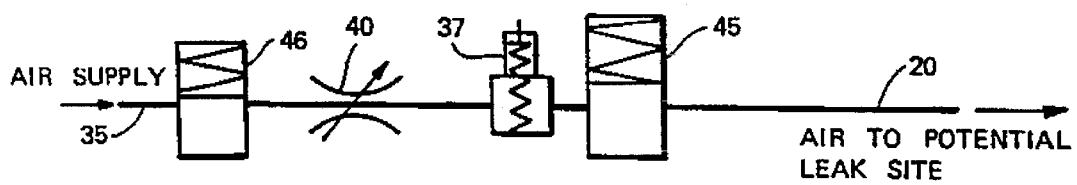
FIG. 2b is a schematic diagram of an alternative pneumatic circuit for use with the invention.

Alternatively, (See FIG. 2b) air is supplied at a non-regulated pressure of say about 140 mb to 14 bar directly to the flow regulator 40 which releases air thorough the conduit past a pressure relief valve 37 to the pressure sensor 45. This may be an electrical/electronic sensor having an on/off, variable or linear output, e.g. a piezo electric or strain gauge type sensor. The pressure relief valve has an operating pressure of about 207 mb, for example.

Any suitable means may be employed to ensure a relatively constant low pressure air supply (or vacuum) upstream of the pressure sensor 45, which is very sensitive and ought to be protected from sudden pressure changes. For example, a small air pump or bellows arrangement may be used when a source of compressed air is not available. Thus, the pressure regulator 36, or the pressure relief valve 37, serve to limit the maximum pressure of supplied air when this is from a convenient compressed air source. A second pressure sensor 46 may be placed in line before the pressure regulator 36 (FIG. 2a) or flow regulator 40 (FIG. 2b) to detect the presence of primary supply air at that location, adapted to signal a failure in primary air supply.

In another embodiment, a fail-safe system is provided in the event of a failure in primary air supply. This requires the pressure sensor 45 to have two switching thresholds instead of one, i.e. (a) a very low switching threshold to sense the small normal back pressure in the conduit 20 when the system is operating leak free, and (b) a higher level switching threshold to sense the increased back pressure when a restriction or blockage occurs. The pressure sensor 45 is then linked to the electronic control circuit to produce an alarm signal indicating a failure in the primary air supply if the lower pressure threshold was not reached.

In yet another embodiment, the pressure sensor 45 is replaced by a feather valve or vane or any means located in the conduit 20 for detecting a restriction in the air flow as opposed to directly measuring a change in air pressure which would be caused by a blockage of the conduit outlet.

Figure 2C:
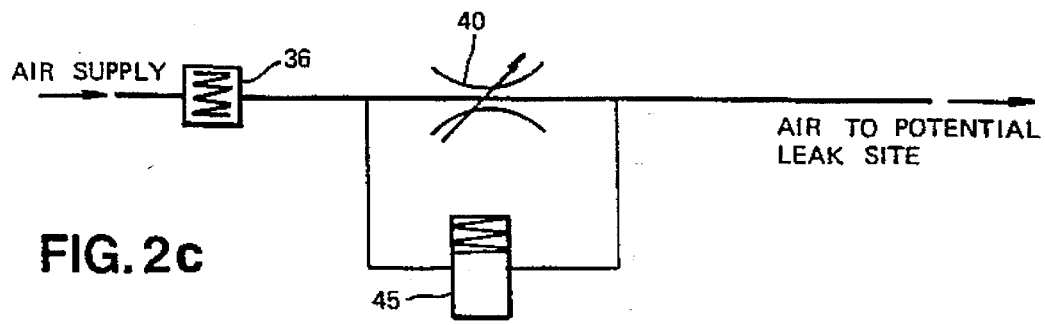
FIG. 2c is a schematic diagram of an alternative fail safe arrangement.

In a still further embodiment, shown in FIG. 2c, the pressure sensor 45 is arranged in parallel with the flow regulator 40. In this embodiment the pressure sensor 45 is employed in a differential mode with a switching threshold of about 5 mb, and the regulated supply pressure is kept close to this, i.e. slightly in excess. This provides a highly sensitive system for detecting small changes in supply pressure and employs only one sensor.

Figure 3:
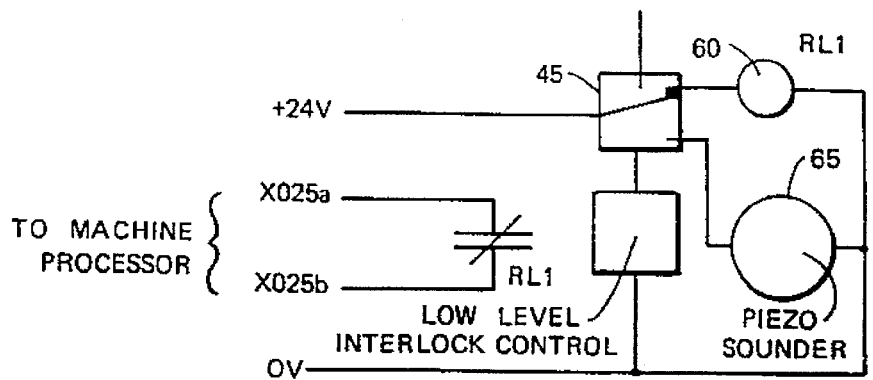
FIG. 3 is a schematic diagram of an electronic control circuit for use with the invention.

FIG. 3 is a schematic diagram of the electrical control circuit pertaining to the invention. The pressure sensor 45 is regulated to operate when the pre-selected pressure level is reached in the conduit, for example if there is a change in pressure of as little as about 5 mb. This activates a relay 60 and a piezo sounder 65. The relay in turn stalls the injection moulding machine through a machine processor.

During normal operation of the injection moulding machine, air is supplied at the regulated pressure (about 140–207 mb) to the flow regulator in the conduit. The flow regulator releases air through the conduit at a constant rate and this results in a relatively constant pressure in the conduit. The pressure gradient between the air in the conduit and the outside atmosphere is quite small.

When a leak occurs, the molten material escapes through the seal and leaks back along the outside of the nozzle. Because of the drop in temperature between the inside and outside of the nozzle the drool slowly solidifies over the outside of the nozzle and in particular over the mouth 26 of the conduit, but more rapidly along the nozzle. When the mouth of the conduit is obstructed pressure builds up in the conduit until the predetermined threshold is exceeded. This activates the alarm and optionally triggers the shut-down of the injection moulding machine.

Figure 4:
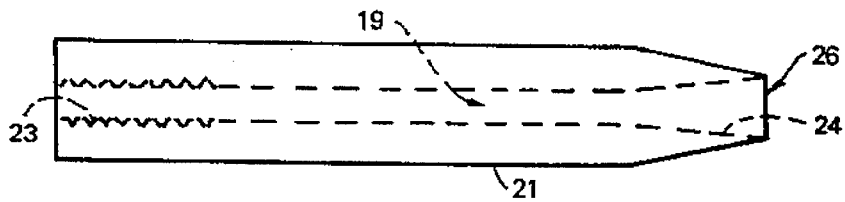
FIG. 4 is an enlarged cross-sectional view of a detachable tip for attachment to the end of the nozzle leak detector conduit.

In a further embodiment a detachable tip is provided at the end of the conduit in the path of the leaking molten plastic for example a tip which may be unscrewed from the conduit 20. An example of a suitable detachable tip 21 is shown in FIG. 4. The purpose of this is to avoid the problem of cleaning any blockage from the mouth 26 of the conduit to facilitate quick servicing of the conduit and a speedy return of the injection moulding machine to operation when a replacement tip is fitted. The tip is made from chrome-plated steel and defines a duct 19 which is internally screw-threaded at the inner end 23, such that the top may be screwed onto the end of the conduit. The outer end 24 of the duct 19 is tapered internally (e.g. at 10–15 degrees). The outer end of the tip 21 is externally bevelled (e.g. also at 10–15 degrees). This facilitates the removal of the drool from the end of the tip 21.

Figure 5:
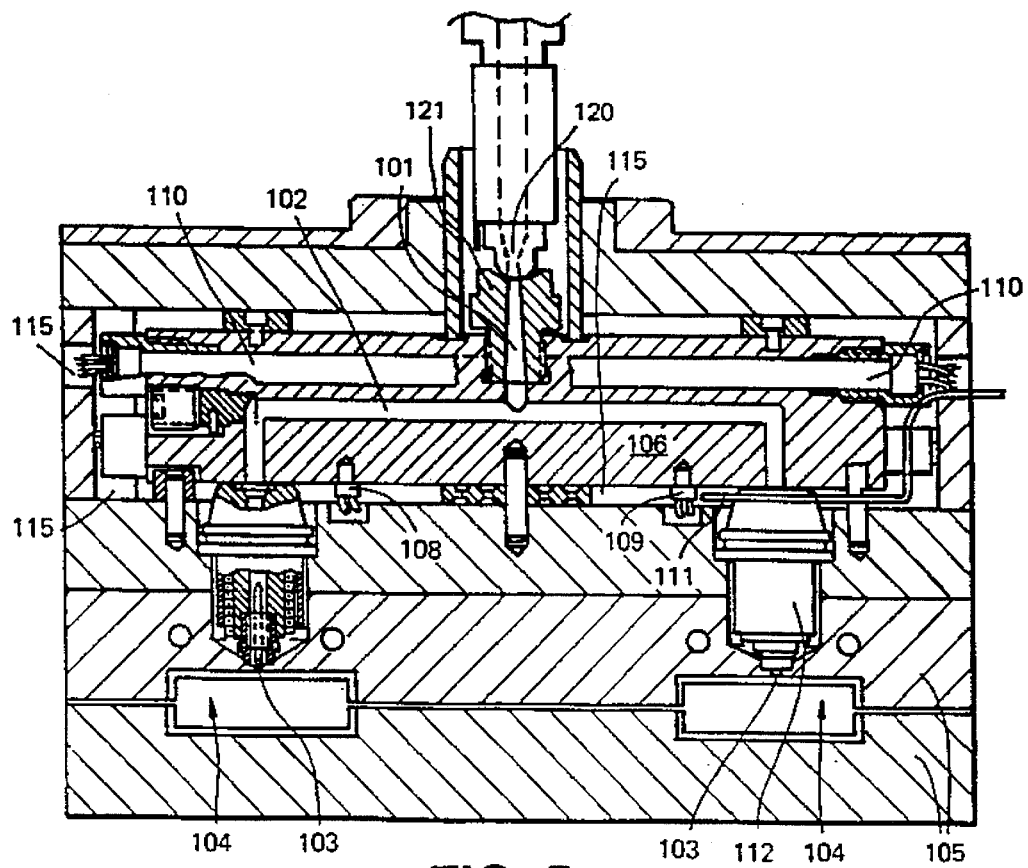
FIG. 5 is a cross-sectional view of a section of an injection moulding machine with a hot runner system, including a leak detector according to the present invention.

FIG. 5 shows how the leak detector of the present invention may be installed in a typical multi-gate hot runner system, comprising sprue and runner channels 101, 102 respectively, gates 103 through which the molten plastics is injected via a main injection nozzle 120 and sprue bush 121 (similar to the arrangement already described with reference to FIG. 1) into a mould cavity 104 of a two-part mould 105. Under normal operating conditions, the plastics in the sprue runner channels 101, 102 is kept in a molten state by means of manifold heaters 110 and associated thermocouples 108, 109 which control the temperature. Channels 115 formed in and around manifold 106 contain wiring associated with the heaters 110 and thermocouples 108, 109. When material is injected into the mould the gates 103 are opened. Any misalignment of parts between the gate assembly 112, the manifold 106 and the sprue bush 121 may cause a leakage to occur of molten plastics. Any leakage into the wiring channels 115 is difficult to detect and can cause considerable damage and machine down time.

A leak detector pipe 111 is shown leading through the wiring channel 115 to a potential leak site at the interface of the gate assembly 112 and the hot runner manifold 106, but may be directed to other potential leak sites, to supply low pressure air as described above. Any blockage of the pipe outlet signals the presence of leaked plastics material, and several leak detector pipes may be employed and monitored centrally by one control circuit to detect possible leaks at a plurality of potential leak sites.

We claim:

1. A plastics injection moulding machine including an injection nozzle and a sprue bush, and having a leak detector for leaks of molten plastics comprising a conduit for supplying a flow of fluid to a conduit outlet located adjacent to the nozzle and the sprue bush, a source of fluid in communication with the conduit outlet, means capable of sensing changes in fluid pressure inside the conduit caused by the presence of leaked material blocking the conduit outlet and of producing an electronic output signal, and electronic indicating means responsive to the electronic output signal and capable of instantaneously indicating a leak condition.

2. A machine according to claim 1, wherein the source of fluid is air.

3. A machine according to claim 2, wherein air is supplied at a substantially constant pressure.

4. A machine according to claim 3, wherein air pressure at the conduit outlet is less than about 345 mb.

5. A machine according to claim 4, having a flow regulator upstream of the pressure change sensing means.

6. A machine according to claim 5, having a pressure regulator, upstream of the flow regulator, to limit the maximum pressure of supplied air.

7. A machine according to claim 5, having a pressure relief valve, downstream of the flow regulator, to limit the maximum pressure of supplied air.

8. A machine according to claim 1, wherein the conduit is located along the barrel of the injection nozzle.

9. A machine according to claim 1, wherein the conduit is located within the barrel of the injection nozzle.

10. A machine according to claim 1, wherein the conduit is located on a platen adjacent the sprue bush.

11. A machine according to claim 1, wherein the pressure change sensing means comprises a pressure sensor sensitive to changes of pressure within a range of from about 5 mb to about 690 mb.

12. A machine according to claim 1, wherein the electronic indicating means is a relay together with an audible alarm, operatively linked to the machine controls so as to interrupt the operation of the machine during a leak condition.

13. A machine according to claim 1, wherein the conduit outlet defines a detachable tip portion.

14. A plastics injection moulding machine including an injection nozzle and a sprue bush, and having a leak detector for leaks of molten plastics comprising a conduit for supplying intermittent pulses of fluid to a conduit outlet located adjacent to the nozzle and the sprue bush, a source of fluid in communication with the conduit outlet, means capable of sensing changes in fluid back pressure inside the conduit caused by the presence of leaked material blocking the conduit outlet and of producing an electronic output signal, and electronic indicating means responsive to the electronic output signal and capable of instantaneously indicating a leak condition.

15. A machine according to claim 14, wherein the source of fluid is air.

16. A machine according to claim 15, wherein air is supplied as pulses about every 30 seconds.

17. A machine according to claim 14, wherein the conduit is located along the barrel of the injection nozzle.

18. A machine according to claim 14, wherein the conduit is located within the barrel of the injection nozzle.

19. A machine according to claim 14, wherein the conduit is located on a platen adjacent the sprue bush.

20. A machine according to claim 14, wherein the pressure change sensing means comprises a pressure sensor sensitive to changes of back pressure within a range of from about 5 mb to about 690 mb.

21. A machine according to claim 14, wherein the electronic indicating means is a relay together with an audible alarm, operatively linked to the machine controls so as to interrupt the operation of the machine during a leak condition.

22. A machine according to claim 14, wherein the conduit outlet defines a detachable tip portion.

23. A plastics injection moulding machine including an injection nozzle and a sprue bush, and having a leak detector for leaks of molten plastics comprising a conduit for applying a vacuum to a conduit outlet located adjacent to the nozzle and the sprue bush, a source of air in communication with the conduit outlet, means capable of sensing changes in less than atmospheric air pressure inside the conduit caused by the presence of leaked material blocking the conduit outlet and of producing an electronic output signal, and electronic indicating means responsive to the electronic output signal and capable of instantaneously indicating a leak condition.

24. A machine according to claim 23, wherein the conduit is located along the barrel of the injection nozzle.

25. A machine according to claim 23, wherein the conduit is located within the barrel of the injection nozzle.

26. A machine according to claim 23, wherein the conduit is located on a platen adjacent the sprue bush.

27. A machine according to claim 23, wherein the pressure change sensing means comprises a pressure sensor sensitive to changes of pressure within a range of from about 3.75 Torr to about 517 Torr.

28. A machine according to claim 23, wherein the electronic indicating means is a relay together with an audible alarm, operatively linked to the machine controls so as to interrupt the operation of the machine during a leak condition.

29. A machine according to claim 23, wherein the conduit outlet defines a detachable tip portion.

30. A plastics injection moulding machine including an injection nozzle and a sprue bush, and having a leak detector for leaks of molten plastics comprising a conduit for applying a pulsed vacuum to a conduit outlet located adjacent to the nozzle and the sprue bush, a source of air in communication with the conduit outlet, means capable of sensing changes in less than atmospheric air pressure inside the conduit caused by the presence of leaked material blocking the conduit outlet and of producing an electronic output signal, and electronic indicating means responsive to the electronic output signal and capable of instantaneously indicating a leak condition.

31. A machine according to claim 30, wherein the conduit is located along the barrel of the injection nozzle.

32. A machine according to claim 30, wherein the conduit is located within the barrel of the injection nozzle.

33. A machine according to claim 30, wherein the conduit is located on a platen adjacent the sprue bush.

34. A machine according to claim 30, wherein the pressure change sensing means comprises a pressure sensor sensitive to changes of pressure within a range of from about 3.75 Torr to about 517 Torr.

35. A machine according to claim 30, wherein the electronic indicating means is a relay together with an audible alarm, operatively linked to the machine controls so as to interrupt the operation of the machine during a leak condition.

36. A machine according to claim 30, wherein the conduit outlet defines a detachable tip portion.

37. A system for detecting leaks of molten plastics at a plurality of potential leak sites in a plastics injection moulding machine which machine comprises a multi-gate hot runner arrangement comprising a manifold defining channels communicating with gates through which molten plastics is injected via a main injection nozzle and sprue bush into a two-part mould defining a mould cavity, the manifold also defining heater wiring ducts, in which the leak detection system comprises at least one conduit for supplying a flow of fluid to an outlet thereof located adjacent to a respective potential leak site in the system, a source of fluid in communication with each respective conduit outlet, means capable of sensing changes in fluid pressure inside each of the conduits caused by the presence of leaked molten plastics material blocking the respective conduit outlet and capable of producing an identifiable electronic output signal, and control circuit means for simultaneously monitoring said identifiable output signals so as to detect a leak at the different potential leak sites, and for indicating the location of any leak condition.

* * * * *